US010583544B2

(12) United States Patent
Herr

(10) Patent No.: US 10,583,544 B2
(45) Date of Patent: Mar. 10, 2020

(54) HAND-HELD POWER TOOL DEVICE

(71) Applicant: Robert Bosch GmbH, Stuttgart (DE)

(72) Inventor: Tobias Herr, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 525 days.

(21) Appl. No.: 14/406,066

(22) PCT Filed: May 14, 2013

(86) PCT No.: PCT/EP2013/059869
§ 371 (c)(1),
(2) Date: Dec. 5, 2014

(87) PCT Pub. No.: WO2013/182384
PCT Pub. Date: Dec. 12, 2013

(65) Prior Publication Data

US 2015/0129268 A1 May 14, 2015

(30) Foreign Application Priority Data

Jun. 5, 2012 (DE) ........................ 10 2012 209 446

(51) Int. Cl.
*B25B 21/02* (2006.01)
*B25D 16/00* (2006.01)
(Continued)

(52) U.S. Cl.
CPC ............ *B25B 21/026* (2013.01); *B25D 11/08* (2013.01); *B25D 11/104* (2013.01); *B25D 16/00* (2013.01);
(Continued)

(58) Field of Classification Search
CPC ....... B25B 21/02; B25B 21/026; B25B 21/00; B25D 16/006
(Continued)

(56) References Cited

U.S. PATENT DOCUMENTS 4,236,588 A * 12/1980 Moldan ................ B25D 16/006 173/201
4,763,733 A * 8/1988 Neumaier ............ B25D 16/006 173/109
(Continued)

FOREIGN PATENT DOCUMENTS

CN 1781673 A 6/2006
CN 101664917 A 3/2010
(Continued)

OTHER PUBLICATIONS

International Search Report for PCT/EP2013/059869, dated Aug. 2, 2013.

*Primary Examiner* — Gloria R Weeks
(74) *Attorney, Agent, or Firm* — Norton Rose Fulbright US LLP; Gerard Messina

(57) ABSTRACT

A hand-held power tool device is described which includes an output unit, a striker, and a rotary percussion receiver which is designed for establishing a transfer of rotary percussions between the striker and the output unit, at least during a rotary percussion operation. It is provided that the hand-held power tool device includes a rotary percussion switch-off device which is designed for interrupting the transfer of rotary percussions from the striker to the rotary percussion receiver, at least during a hammer percussion operation.

10 Claims, 3 Drawing Sheets

(51) Int. Cl.
*B25D 11/08* (2006.01)
*B25D 11/10* (2006.01)

(52) U.S. Cl.
CPC ...... *B25D 16/003* (2013.01); *B25D 2211/006* (2013.01); *B25D 2216/0023* (2013.01); *B25D 2216/0038* (2013.01); *B25D 2250/045* (2013.01); *B25D 2250/231* (2013.01)

(58) Field of Classification Search
USPC ...................................................... 173/47, 48
See application file for complete search history.

(56) References Cited

U.S. PATENT DOCUMENTS

| | | | | | |
|---|---|---|---|---|---|
| 5,379,848 | A * | 1/1995 | Rauser | B25D 16/003 | 173/109 |
| 5,522,606 | A * | 6/1996 | Pressley | B25D 17/08 | 173/132 |
| 5,820,312 | A * | 10/1998 | Stock | B25D 16/00 | 408/17 |
| 5,836,403 | A * | 11/1998 | Putney | B25B 21/02 | 173/109 |
| 5,992,538 | A * | 11/1999 | Marcengill | B25D 11/102 | 173/171 |
| 6,015,017 | A * | 1/2000 | Lauterwald | B25D 16/006 | 173/109 |
| 6,192,996 | B1 * | 2/2001 | Sakaguchi | B25D 16/00 | 173/109 |
| 6,196,330 | B1 * | 3/2001 | Matthias | B25D 16/00 | 173/109 |
| 6,598,684 | B2 * | 7/2003 | Watanabe | B25B 21/02 | 173/176 |
| 6,913,090 | B2 * | 7/2005 | Droste | B25D 16/00 | 173/104 |
| 6,976,545 | B2 * | 12/2005 | Greitmann | B25D 16/003 | 173/104 |
| 7,096,972 | B2 * | 8/2006 | Orozco, Jr. | B25D 11/102 | 173/114 |
| 7,213,659 | B2 * | 5/2007 | Saito | B25D 11/106 | 173/109 |
| 7,306,048 | B2 * | 12/2007 | Yamazaki | B25D 11/005 | 173/212 |
| 7,314,097 | B2 * | 1/2008 | Jenner | B25B 21/00 | 173/178 |
| 7,350,592 | B2 * | 4/2008 | Hahn | B25D 11/104 | 173/109 |
| 7,383,893 | B2 * | 6/2008 | Shimma | B25D 16/006 | 173/104 |
| 7,410,007 | B2 * | 8/2008 | Chung | B25B 21/02 | 173/176 |
| 7,673,702 | B2 * | 3/2010 | Johnson | B25B 21/00 | 173/109 |
| 7,735,575 | B2 * | 6/2010 | Trautner | B25D 11/106 | 173/114 |
| 7,748,472 | B2 * | 7/2010 | Yoshikane | B25D 16/006 | 173/102 |
| 7,806,198 | B2 * | 10/2010 | Puzio | B25B 21/00 | 173/1 |
| 7,931,095 | B2 * | 4/2011 | Machida | B25D 11/062 | 173/104 |
| 8,047,057 | B2 * | 11/2011 | Chen | B23B 45/008 | 173/216 |
| 8,381,831 | B2 * | 2/2013 | Sekino | B23B 45/008 | 173/216 |
| 8,631,880 | B2 * | 1/2014 | Murthy | B25B 21/023 | 173/109 |
| 8,760,102 | B2 * | 6/2014 | Hirabayashi | B23B 45/008 | 318/3 |
| 9,010,456 | B2 * | 4/2015 | Sieber | B25D 11/125 | 173/109 |
| 9,121,478 | B2 * | 9/2015 | Herr | F16H 1/46 | |
| 9,381,626 | B2 * | 7/2016 | Profunser | B25B 21/026 | |
| 9,573,254 | B2 * | 2/2017 | Bartoszek | B25B 21/02 | |
| 9,827,660 | B2 * | 11/2017 | Blum | B25D 16/006 | |
| 2005/0173139 | A1 * | 8/2005 | Furuta | B25B 21/00 | 173/48 |
| 2005/0263305 | A1 * | 12/2005 | Shimizu | B25B 23/1405 | 173/2 |
| 2006/0237205 | A1 * | 10/2006 | Sia | B25B 21/00 | 173/48 |
| 2007/0000674 | A1 * | 1/2007 | Sell | B25D 11/10 | 173/48 |
| 2007/0007024 | A1 * | 1/2007 | Tokairin | B25D 11/106 | 173/48 |
| 2007/0012466 | A1 * | 1/2007 | Sell | B25D 11/108 | 173/48 |
| 2007/0056756 | A1 * | 3/2007 | Chung | B25B 21/00 | 173/48 |
| 2008/0000663 | A1 * | 1/2008 | Sell | B25D 11/10 | 173/93.6 |
| 2009/0151966 | A1 * | 6/2009 | Chen | B25B 21/02 | 173/48 |
| 2010/0000749 | A1 * | 1/2010 | Andel | B25B 21/02 | 173/48 |
| 2010/0000750 | A1 * | 1/2010 | Andel | B25B 21/00 | 173/48 |
| 2010/0025059 | A1 * | 2/2010 | Felger | B25D 16/006 | 173/47 |
| 2010/0071923 | A1 * | 3/2010 | Rudolph | B25B 21/00 | 173/48 |
| 2010/0186977 | A1 * | 7/2010 | Zhang | B25B 21/026 | 173/48 |
| 2010/0193206 | A1 * | 8/2010 | Teng | B25B 21/02 | 173/48 |
| 2010/0276168 | A1 * | 11/2010 | Murthy | B25B 21/023 | 173/93.5 |
| 2010/0326685 | A1 * | 12/2010 | Roehm | B25D 16/00 | 173/46 |
| 2010/0326686 | A1 * | 12/2010 | Leong | B25B 21/026 | 173/48 |
| 2011/0011607 | A1 * | 1/2011 | Gumpert | B25D 11/005 | 173/112 |
| 2011/0114346 | A1 * | 5/2011 | Suzuki | B25B 21/02 | 173/2 |
| 2012/0132451 | A1 * | 5/2012 | Hecht | B25D 11/062 | 173/48 |
| 2012/0160533 | A1 * | 6/2012 | Kamegai | B25D 17/24 | 173/162.2 |
| 2012/0234570 | A1 * | 9/2012 | Machida | B23Q 11/0046 | 173/197 |
| 2012/0261153 | A1 * | 10/2012 | Aoki | B25D 16/00 | 173/162.1 |
| 2012/0279736 | A1 * | 11/2012 | Tanimoto | B25B 21/02 | 173/2 |
| 2013/0062088 | A1 * | 3/2013 | Mashiko | B25B 21/026 | 173/2 |
| 2013/0112446 | A1 * | 5/2013 | Chai | B25D 16/006 | 173/48 |
| 2013/0161042 | A1 * | 6/2013 | Blum | B23Q 5/12 | 173/48 |
| 2013/0161043 | A1 * | 6/2013 | Blum | B25D 16/006 | 173/48 |
| 2014/0338946 | A1 * | 11/2014 | Herr | B25D 16/006 | 173/104 |
| 2015/0083451 | A1 * | 3/2015 | Nishikawa | B25B 21/026 | 173/48 |

FOREIGN PATENT DOCUMENTS

| | | | |
|---|---|---|---|
| CN | 102476375 | A | 5/2012 |
| EP | 2168724 | | 3/2010 |

* cited by examiner

HAND-HELD POWER TOOL DEVICE

FIELD OF THE INVENTION

An impact screwdriver which includes an output unit, a striker, and a rotary percussion receiver which is provided for establishing a transfer of rotary percussions between the striker and the output unit, at least during a rotary percussion operation, has previously been provided.

SUMMARY

The present invention is directed to a hand-held power tool device which includes an output unit, a striker, and a rotary percussion receiver which is provided for establishing a transfer of rotary percussions between the striker and the output unit, at least during a rotary percussion operation.

It is provided that the hand-held power tool device includes a rotary percussion switch-off device which is provided for interrupting the transfer of rotary percussions from the striker to the rotary percussion receiver, at least during a hammer percussion operation. An "output unit" is understood in particular to mean a unit which is provided for being coupled to a tool chuck in particular in a rotationally fixed manner. Alternatively or additionally, the output unit could be designed, at least in part, in one piece with a tool chuck. The output unit preferably includes a tool chuck spindle which is provided for transmitting a rotary motion to the tool chuck. The tool chuck spindle preferably transfers at least one rotary percussion pulse to the tool chuck. The tool chuck spindle is preferably provided for transferring at least one hammer percussion pulse to the tool chuck. Alternatively, the output unit could include a snap die which is provided for transferring the hammer percussion pulse to the tool chuck. The term "striker" is understood in particular to mean a means which, at least during a rotary percussion operation, is accelerated at least rotationally, and/or which during a hammer percussion operation is accelerated at least translationally, and which delivers a pulse, received during the acceleration, as a rotary percussion pulse and/or as a hammer percussion pulse, in the direction of an output unit. The striker preferably has a one-part design. Alternatively, the striker could have a multi-part design. A "rotary percussion receiver" is understood in particular to mean a means which is in particular directly impacted by the striker during a rotary percussion operation. The rotary percussion receiver is preferably connected in a rotationally fixed manner to the output unit in at least one operating state, preferably at least in a rotary percussion mode. The rotary percussion receiver is preferably permanently connected in a rotationally fixed manner to the output unit. Alternatively, the rotary percussion receiver could be connected in a rotationally fixed manner to the output unit only in the rotary percussion mode. The rotary percussion receiver preferably has teeth in which teeth of the striker engage during the rotary percussion operation in order to transfer the rotary percussion pulse. The term "provided" is understood in particular to mean specially equipped and/or designed. A "rotary percussion operation" is understood in particular to mean an operating state in which the striker transfers to the output unit, via the rotary percussion receiver, a series of rotary percussion pulses received due to a rotational acceleration. The phrase "transfer rotary percussions" is understood in particular to mean that in at least one operating state the rotary percussion receiver establishes a mechanical connection via which the series of rotary percussion pulses during the rotary percussion operation is transferred from the striker to the output unit. A "rotary percussion switch-off device" is understood in particular to mean a device which is provided for transferring the series of rotary percussion pulses during an operation. The rotary percussion switch-off device preferably moves a rotary percussion surface of the rotary percussion receiver and an effective range of the striker away from one another, in particular in the axial direction. Alternatively or additionally, the rotary percussion switch-off device interrupts the rotational acceleration of the striker. A "hammer percussion operation" is understood in particular to mean an operating state in which the striker transfers a series of hammer percussion pulses, received due to an acceleration in the axial direction, to the output unit. The phrase "interrupt a transfer of rotary percussions" is understood in particular to mean that in at least one operating state, preferably during a transition from the rotary percussion operation into the hammer percussion operation, the rotary percussion switch-off device terminates, in particular periodically, the transfer of the series of rotary percussion pulses from the striker to the output unit. Due to the design according to the present invention of the hand-held power tool device, a hand-held power tool may be provided which in particular has numerous versatile uses.

In another embodiment it is provided that the striker is provided for delivering at least one rotary percussion pulse during the rotary percussion operation, and for delivering at least one hammer percussion pulse during the hammer percussion operation, in the direction of the output unit, as the result of which a hand-held power tool having numerous versatile uses with an advantageously small design may be implemented. A "rotary percussion pulse" is understood in particular to mean a rotary pulse which rotationally drives the output unit and in particular the tool chuck during the rotary percussion operation. An energy of the rotary percussion pulse which is transferred to the output unit during the rotary percussion operation is preferably at least two times, advantageously four times, as large as an energy of the hammer percussion pulse which is transferred to the output unit. A "hammer percussion pulse" is understood in particular to mean a pulse which acts in the axial direction and which during the hammer percussion operation drives at least one insertion tool, secured by the tool chuck, with a motion facing away from the striker. The energy of the hammer percussion pulse which is transferred to the output unit during the hammer percussion operation is preferably at least two times, preferably four times, as large as the energy of the rotary percussion pulse which is transferred to the output unit.

In addition, it is provided that the rotary percussion switch-off device is provided for supporting the rotary percussion receiver in an axially displaceable manner, thus allowing switching over between the rotary percussion operation and the hammer percussion operation via a simple design. The term "supporting in an axially displaceable manner" is understood in particular to mean that the rotary percussion switch-off device is provided for changing a position of the rotary percussion receiver relative to the output unit and/or relative to a stop position of the striker.

Furthermore, it is provided that the hand-held power tool device includes a striker catch device which, at least during the hammer percussion operation, secures the striker, at least temporarily, in a rotationally fixed manner, as the result of which the striker may be used for generating the rotary percussion pulse and for generating the hammer percussion pulse via a simple design. A "striker catch device" is understood in particular to mean a device which is provided for braking a rotational motion of the striker, in particular to a rotary standstill. The striker catch device is preferably provided for securing the striker axially displaceably and in a rotationally fixed manner during the hammer percussion operation. In one embodiment, the striker catch device is provided for capturing the striker in an orientation in which the teeth of the striker and the teeth of the rotary percussion receiver are engaged with one another. The term "secure in a rotationally fixed manner" is understood in particular to mean that the striker catch device exerts a force on the striker which at least temporarily counteracts a rotational acceleration of the striker due to a drive of the striker.

In addition, it is provided that the striker catch device rotatably unblocks the striker in the peripheral direction at least during the rotary percussion operation, thus allowing an advantageous rotary percussion operation via a simple design. The phrase "rotatably unblocks in the peripheral direction" is understood in particular to mean that the striker catch device allows the striker to move freely during the rotary percussion operation.

Furthermore, it is provided that the hand-held power tool device includes a rotary drive shaft which is provided for rotationally driving the output unit at least in a percussion drill mode and in particular in a drill and/or screw mode, as the result of which the various operating modes may be provided via a simple design. A "rotary drive shaft" is understood in particular to mean a shaft which transmits the rotational motion generated by a drive unit of the hand-held power tool device in particular directly to the output unit. A "percussion drill mode" is understood in particular to mean a mode in which the tool chuck rotationally drives the insertion tool during a work process, and drives the insertion tool in a percussive manner in the axial direction. The phrase "rotationally drives" is understood in particular to mean that the rotary drive shaft transmits a torque to the output unit, which drives the output unit in motion about a rotational axis.

In one advantageous embodiment of the present invention, it is provided that the hand-held power tool device includes a rotary drive coupling which is provided for disconnecting the rotary drive shaft and the output unit, at least in a rotary percussion mode, thus allowing a switchover between the operating modes with little effort. A "rotary drive coupling" is understood in particular to mean a device which is provided for transmitting a rotational motion from the rotary drive shaft in particular directly to the output unit. A "rotary percussion mode" is understood in particular to mean a mode in which the tool chuck percussively drives the insertion tool in the peripheral direction during a work process. The tool chuck preferably fixes the insertion tool in the axial direction in the rotary percussion mode. In this context, the term "disconnect" is understood in particular to mean that the rotary drive coupling interrupts the transmission of the rotational motion from the rotary drive shaft to the output unit.

In addition, it is provided that the striker at least largely surrounds the rotary drive shaft on at least one plane, as the result of which a particularly small installation size with a large striker mass may be achieved. In particular, the phrase "at least largely surrounds on at least one plane" is understood to mean that rays emanating from an axis of the rotary drive shaft which are situated on the plane intersect the striker over an angular range of at least 180 degrees, advantageously at least 270 degrees. The striker particularly advantageously surrounds the rotary drive shaft over 360 degrees.

Furthermore, it is provided that the hand-held power tool device includes a striker drive shaft which at least largely surrounds the rotary drive shaft on at least one plane, as the result of which a compact design and simple assembly may be achieved. A "striker drive shaft" is understood in particular to mean a shaft which is provided for transmitting in particular only energy for generating percussion.

In addition, it is provided that the hand-held power tool device includes a striker coupling which is provided for decoupling the striker at least in a drill mode, thus allowing the various operating modes to be provided via a simple design. A "striker coupling" is understood in particular to mean a coupling which is provided for transmitting a rotational motion to the striker drive shaft. A "drill mode" is understood to mean in particular a mode in which the tool chuck continually drives, at least temporarily, the insertion tool in rotation in the peripheral direction during a work process. The tool chuck preferably fixes the insertion tool in the axial direction in the rotary percussion mode. The drill mode may preferably also be used for screwing, for which purpose the hand-held power tool device preferably includes a torque limiter.

Furthermore, it is provided that the hand-held power tool device includes a chisel coupling which is provided for securing the output unit in a rotationally fixed manner in a chisel mode, thus allowing an advantageous chisel operation to be achieved. A "chisel coupling" is understood in particular to mean a device which is provided for securing the output unit in a rotationally fixed manner relative to a hand-held power tool housing. A "chisel mode" is understood in particular to mean a mode in which the tool chuck percussively drives the insertion tool in the axial direction during a work process and fixes same in the peripheral direction.

DETAILED DESCRIPTION

Figure 1:
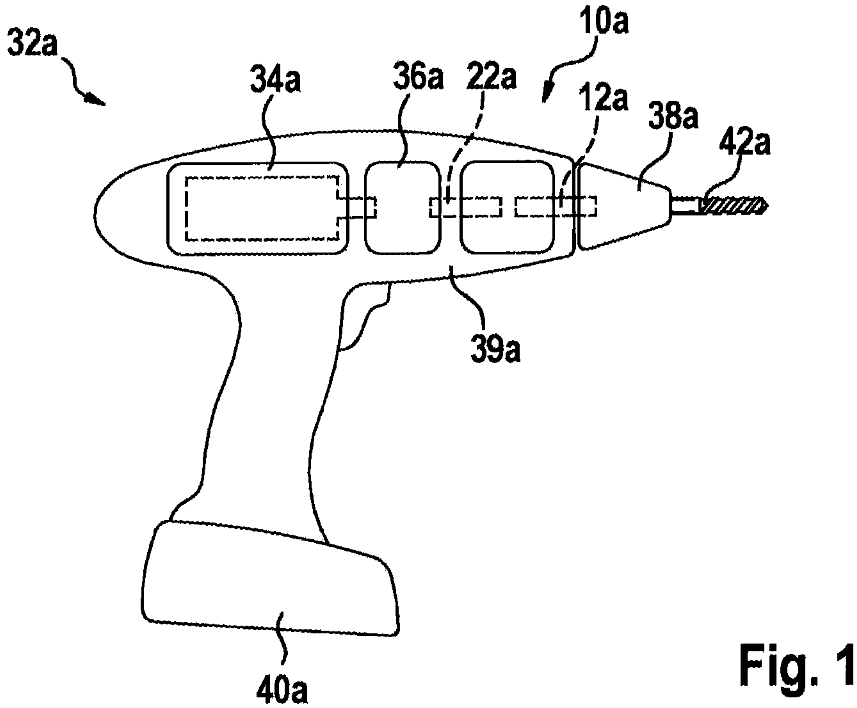
FIG. 1 shows a hand-held power tool which includes a hand-held power tool device according to the present invention in a schematic sectional illustration.

FIG. 1 shows a hand-held power tool **32*a* which includes a hand-held power tool device 10*a* according to the present invention, a drive unit 34*a*, a gear 36*a*, a tool chuck 38*a*, a hand-held power tool housing 39*a*, and a hand-held power tool battery 40*a*. Hand-held power tool battery 40*a* provides drive unit 34*a* with operating energy. Hand-held power tool battery 40*a* is connected to hand-held power tool housing 39*a*, and is detachable from same by an operator. Hand-held power tool housing 39*a* has a gun-like basic shape. Hand-held power tool housing 39*a* connects in each case a portion of hand-held power tool device 10*a*, of drive unit 34*a*, and of gear 36*a*. Tool chuck 38*a* is provided for securing an insertion tool 42*a* in the axial direction in a rotationally fixed manner. Gear 36*a* is provided for reducing a rotational speed of drive unit 34*a* to a rotational speed of tool chuck 38*a*. A gear ratio of gear 36***a* is settable in two stages. Drive unit 34*a* is provided for converting electrical energy originating from hand-held power tool battery 40*a* into a rotational motion.

Figure 2:
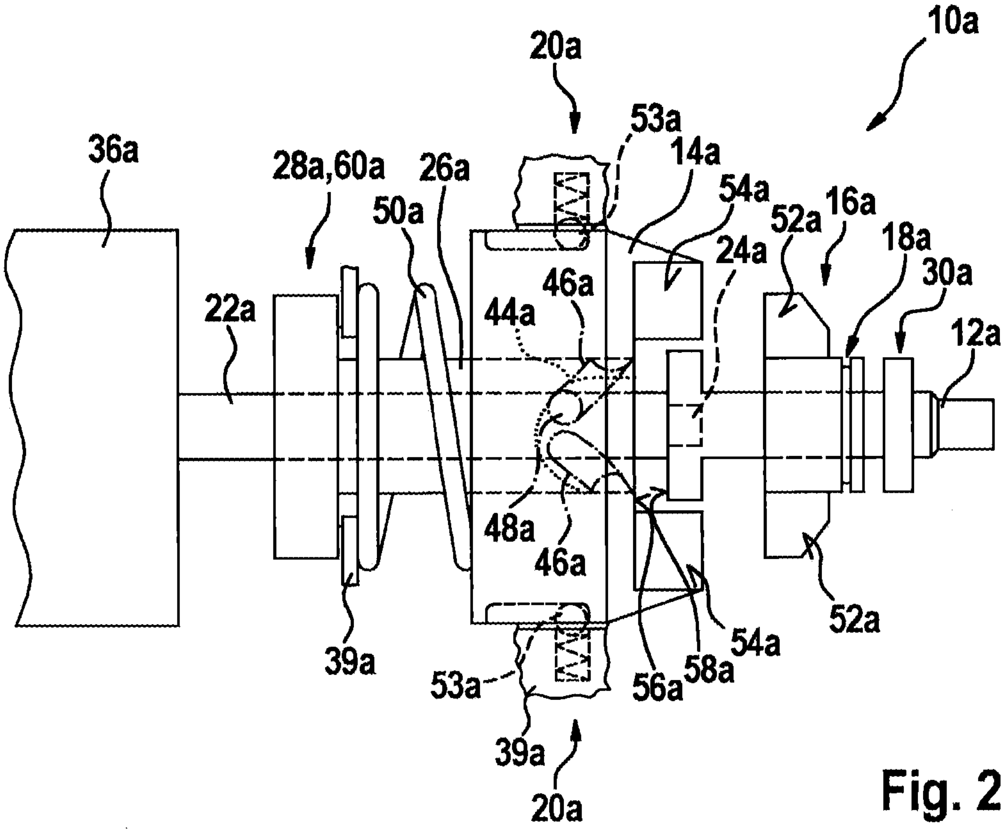
FIG. 2 shows the hand-held power tool device from FIG. 1 in a partial schematic side view.
Figure 3:
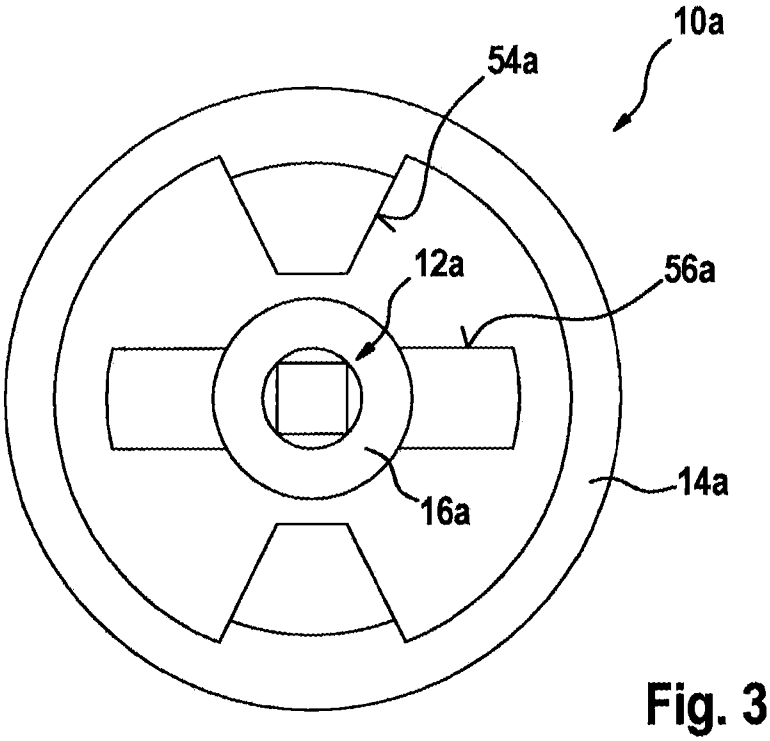
FIG. 3 shows the hand-held power tool device from FIG. 1 in an illustration from the front.
Figure 4:
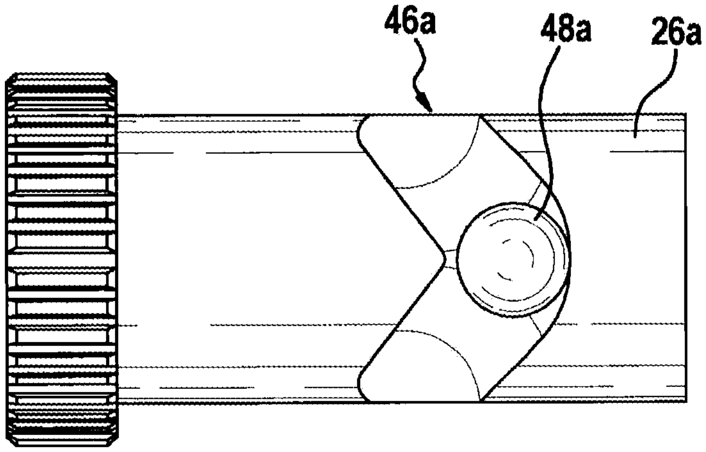
FIG. 4 shows a striker drive shaft of the hand-held power tool device from FIG. 1 in a side view.

FIGS. 2 through 4 show hand-held power tool device 10*a*. Hand-held power tool device 10*a* includes an output unit 12*a*. Output unit 12*a* is connected in the axial direction to tool chuck 38*a* in a rotationally fixed manner. Output unit 12*a* is supported in hand-held power tool housing 39*a* in an axially displaceable and rotatable manner. Output unit 12*a* is designed as a tool spindle. Output unit 12*a* transfers a rotational motion, a rotary percussion pulse, and/or a hammer percussion pulse directly to tool chuck 38*a* during a work process.

Hand-held power tool device 10*a* includes a striker 14*a* and a striker drive shaft 26*a*. Striker 14*a* is driven by striker drive shaft 26*a* during a rotary percussion operation and during a hammer percussion operation. Striker drive shaft 26*a* is designed as a hollow shaft. Striker 14*a* includes two curved tracks 44*a*, of which a first curved track 44*a*, facing the observer, is illustrated by a dotted line. The second of curved tracks 44*a* is situated symmetrically on an opposite side of striker drive shaft 26*a*. Curved tracks 44*a* of striker 14*a* are situated on an inner side of striker 14*a*. Striker drive shaft 26*a* includes two curved tracks 46*a*, illustrated by a dash-dotted line. Curved tracks 46*a* of striker drive shaft 26*a* are situated on a side of striker drive shaft 26*a* facing striker 14*a*, i.e., on an outer side of striker drive shaft 26*a*.

Hand-held power tool device 10*a* includes two connecting means 48*a* which are provided for converting a rotational motion of striker drive shaft 26*a* into a rotary percussion motion and/or a hammer percussion motion of striker 14*a*. Only one of connecting means 48*a* is illustrated. Each of connecting means 48*a* extends in one of curved tracks 44*a* of striker 14*a* and in one of curved tracks 46*a* of striker drive shaft 26*a*. Hand-held power tool device 10 includes a percussion spring 50*a* which exerts a force on striker 14*a* in the direction of tool chuck 38*a*.

Hand-held power tool device 10*a* includes a rotary percussion receiver 16*a*. Rotary percussion receiver 16*a* is connected in a rotationally fixed manner to output unit 12*a* during the rotary percussion operation. A rotary percussion switch-off device 18*a* of hand-held power tool device 10*a* supports rotary percussion receiver 16*a* in an axially displaceable manner. Rotary percussion switch-off device 18*a* has a groove which is introduced into rotary percussion receiver 16*a*, and a mechanism, not illustrated in greater detail and considered meaningful by those skilled in the art, for axially displacing rotary percussion receiver 16*a*. Rotary percussion receiver 16*a* is illustrated in a position which is displaced in the direction of tool chuck 38*a*, i.e., as during a hammer percussion operation. Rotary percussion receiver 16*a* is displaced into a position situated in the direction of striker 14*a* during the rotary percussion operation. Rotary percussion receiver 16*a* includes two rotary percussion surfaces 52*a* which striker 14*a* impacts during the rotary percussion operation, and in the process transfers the rotary percussion pulse to same.

Striker 14*a* is movably supported in the peripheral direction during the rotary percussion operation. During the rotary percussion operation, connecting means 48*a* move striker 14*a* in a direction facing away from rotary percussion receiver 16*a*. In the process, connecting means 48*a* accelerate striker 14*a* in the peripheral direction. Striker 14*a* absorbs the rotary percussion pulse. Percussion spring 50*a* pushes striker 14*a* back in the direction of rotary percussion receiver 16*a*. Rotary percussion surfaces 54*a* of striker 14*a* impact rotary percussion surfaces 52*a* of rotary percussion receiver 16*a* and transfer the rotary percussion pulse to rotary percussion receiver 16*a*. In a rotary percussion operation, rotary percussion receiver 16*a* brings about a transfer of rotary percussions between striker 14*a* and output unit 12*a* by transferring the rotary percussion pulse from striker 14*a* to output unit 12*a*.

Rotary percussion switch-off device 18*a* is provided for interrupting the transfer of rotary percussions from striker 14*a* to rotary percussion receiver 16*a* for the hammer percussion operation. For this purpose, rotary percussion switch-off device 18*a* moves rotary percussion receiver 16*a* into a position in which rotary percussion surfaces 52*a* of rotary percussion receiver 16*a* are situated out of range of rotary percussion surfaces 54*a* of striker 14*a*. A striker catch device 20*a* of hand-held power tool device 10*a* temporarily secures striker 14*a* in a rotationally fixed manner during the hammer percussion operation. Striker catch device 20*a* includes spring-loaded balls 53*a* which are provided for engaging with a groove in striker 14*a* which extends in the axial direction. Striker catch device 20*a* rotatably unblocks striker 14*a* in the peripheral direction during the entire rotary percussion operation. For this purpose, striker catch device 20*a* includes a mechanism, not illustrated in greater detail, which is considered meaningful by those skilled in the art.

While striker catch device 20*a* secures striker 14*a* in a rotationally fixed manner during the hammer percussion operation, connecting means 48*a* move striker 14*a* against percussion spring 50*a* in a direction facing away from output unit 12*a*. When a force exerted by connecting means 48*a* on striker 14*a* in the peripheral direction exceeds a retaining force of striker catch device 20*a*, striker catch device 20*a* unblocks striker 14*a*. Percussion spring 50*a* accelerates striker 14*a* in the direction of output unit 12*a*. In the process, striker 14*a* rotates. Striker 14*a* impacts, with a hammer percussion surface 56*a* of striker 14*a*, a hammer percussion surface 58*a* of output unit 12*a*. In the process, striker 14*a* delivers the hammer percussion pulse to output unit 12*a*. Striker catch device 20*a* subsequently secures striker 14*a* once again in a rotationally fixed manner. Thus, striker 14*a* is provided for delivering a rotary percussion pulse during the rotary percussion operation, and for delivering a hammer percussion pulse during the hammer percussion operation, in the direction of output unit 12*a*.

Hand-held power tool device 10*a* includes a rotary drive shaft 22*a* which is provided for rotationally driving output unit 12*a* in a percussion drill mode and in a drill and/or screw mode. Hand-held power tool device 10*a* includes a rotary drive coupling 24*a* which is provided for connecting rotary drive shaft 22*a* and output unit 12*a* in a rotationally fixed manner in the percussion drill mode and in the drill and/or screw mode. Rotary drive coupling 24*a* is provided for disconnecting rotary drive shaft 22*a* and output unit 12*a* in a rotary percussion mode and in a chisel mode. Striker 14*a* surrounds rotary drive shaft 22*a* on a plane which is oriented perpendicularly with respect to a rotational axis of rotary drive shaft 22*a*.

Striker drive shaft 26*a* surrounds rotary drive shaft 22*a* on a plane which is likewise oriented perpendicularly with respect to a rotational axis of rotary drive shaft 22*a*. Hand-held power tool device 10*a* includes a striker coupling 28*a* which is provided for rotationally driving striker drive shaft 26*a* in the percussion drill mode, in the chisel mode, and in the rotary percussion mode. Striker coupling 28*a* is provided for decoupling striker 14*a* in the drill and/or screw mode by decoupling striker drive shaft 26*a*. In the present case, striker coupling 28*a* is designed partly in one piece with a gear stage 60*a* of hand-held power tool device 10*a*, which is provided for increasing a rotational speed of rotary drive shaft 22*a* to a rotational speed of striker drive shaft 26*a*. Alternatively, a gear stage could decrease a rotational speed of a striker drive shaft to a rotational speed of a rotary drive shaft.

Hand-held power tool device 10 includes a chisel coupling 30*a*, schematically illustrated in FIG. 2, which is provided for securing output unit 12*a* in a rotationally fixed manner in the chisel mode.

Figure 5:
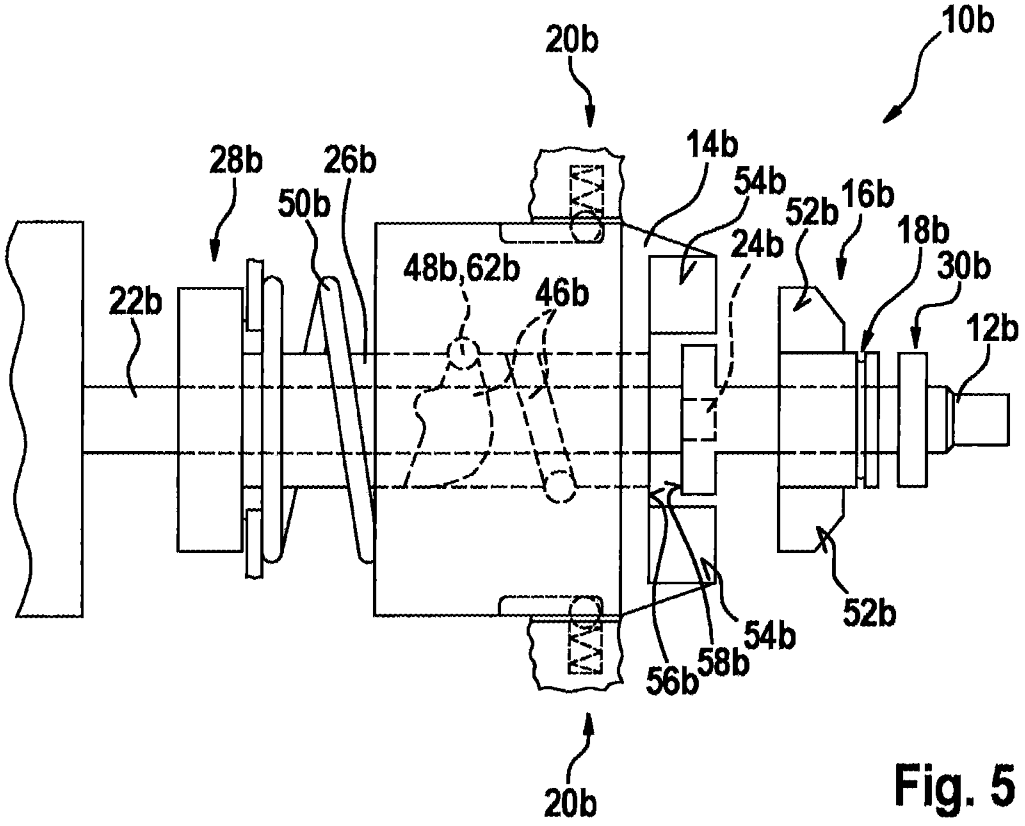
FIG. 5 shows an alternative specific embodiment of the hand-held power tool device from FIG. 1 in a partial schematic side view.
Figure 6:
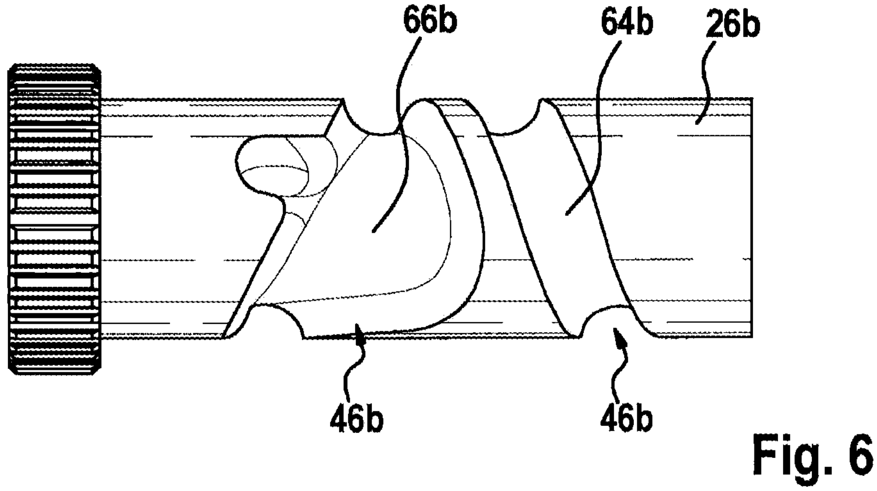
FIG. 6 shows a striker drive shaft of the hand-held power tool device from FIG. 5 in a side view.

FIGS. 5 and 6 show another exemplary embodiment of the present invention. The following descriptions and the drawings are limited essentially to the differences between the exemplary embodiments; with regard to components denoted in the same way, in particular components having the same reference numerals, reference may basically also be made to the drawings and/or the description of the other exemplary embodiments in FIGS. 1 through 4. To differentiate between the exemplary embodiments, the letter "a" is added as a suffix to the reference numerals of the exemplary embodiment in FIGS. 1 through 4. In the exemplary embodiment in FIGS. 5 through 6, the letter "a" is replaced by the letter "b."

FIG. 5 shows a hand-held power tool device 10*b* which includes an output unit 12*b*, a striker 14*b*, a rotary percussion receiver 16*b*, a rotary percussion switch-off device 18*b*, a striker catch device 20*b*, and a striker drive shaft 26*b*. Rotary percussion switch-off device 18*b* is provided for bringing about a transfer of rotary percussions between striker 14*b* and output unit 12*b* in a rotary percussion operation. Rotary percussion switch-off device 18*b* is provided for interrupting the transfer of rotary percussions from striker 14*b* to rotary percussion receiver 16*b* in a hammer percussion operation.

FIG. 6 shows striker drive shaft 26*b*. Striker drive shaft 26*b* includes two curved tracks 46*b*. Curved tracks 46*b* have identical curved shapes. Curved tracks 46*b* are offset by 180 degrees about a rotational axis of striker drive shaft 26*b*. Curved tracks 46*b* each have a spiral-shaped striker lift area 64*b* and a clearance area 66*b*. Clearance area 66*b* connects two ends of striker lift area 64*b*. Curved tracks 46*b* surround a rotational axis of striker drive shaft 26*b* over 360 degrees. Two connecting means 48*b* are guided in curved tracks 46*b*. When connecting means 48*b* are situated in clearance areas 66*b*, striker 14*b* is movable in the axial direction. Connecting means 48*b* are situated in positions which are unchangeable relative to striker 14*b*. Connecting means 48*b* are designed as balls which engage with a precise fit in recesses 62*b* in striker 14*b*.

Striker 14*b* and rotary percussion receiver 16*b* have rotary percussion surfaces 54*b*, 52*b*, respectively. Rotary percussion surfaces 52*b*, 54*b* engage with one another during a rotary percussion, thus braking striker 14*b* in the peripheral direction. During the rotary percussion operation, connecting means 48*b* move striker 14*b* against a percussion spring 50*b* of hand-held power tool device 10*b* in a direction facing away from rotary percussion receiver 16*b*. In the process, connecting means 48*b* extend into striker lift area 64*b* of curved tracks 46*b*. Striker 14*b* is rotatably supported during a rotary percussion operation. As soon as striker 14*b* and rotary percussion receiver 16*b* are disengaged, connecting means 48*b* accelerate striker 14*b* in the peripheral direction. The acceleration of striker 14*b* in the peripheral direction is a function of a slope of striker lift areas 64*b*. As soon as connecting means 48*b* enter into clearance areas 66*b* of curved tracks 46*b*, percussion spring 50*b* accelerates striker 14*b* axially in the direction of output unit 12*b* until rotary percussion surfaces 52*b*, 54*b* impact one another and rotary percussion receiver 16*b* transfers the rotary percussion pulse in the direction of output unit 12*b*. Rotary percussion surfaces 52*b*, 54*b* are oriented in such a way that the transfer of the rotary percussion pulse essentially stops the axial movement of striker 14*b*.

Alternatively, the slope of a striker lift area could be designed in such a way that a rotational speed of a striker temporarily exceeds a rotational speed of a rotary drive shaft. The striker would then be guided in the striker lift areas by guide means during a movement in the direction of an output unit.

In the hammer percussion operation, rotary percussion surfaces 52*b* of rotary percussion receiver 16*b* are situated outside a range of rotary percussion surfaces 54*b* of striker 14*b*. Striker catch device 20*b* secures striker 14*b* in an axially displaceable and rotationally fixed manner during the entire hammer percussion operation. Striker lift areas 64*b* of curved tracks 46*b* move striker 14*b* against percussion spring 50*b* via connecting means 48*b*. Percussion spring 50*b* moves striker 14*b* in the direction of output unit 12*b* as soon as connecting means 48*b* are situated in clearance areas 66*b*. A hammer percussion surface 56*b* of striker 14*b* transfers a hammer percussion pulse to a hammer percussion surface 58*b* of output unit 12*b*.

What is claimed is:

1. A hand-held power tool device, comprising:

an output unit including a hammer percussion surface;

a striker including a hammer percussion surface and at least two rotary percussion surfaces;

a rotary percussion receiver for establishing a transfer of a rotary percussion between the striker and the output unit at least during a rotary percussion mode of the hand-held power tool device, the rotary percussion receiver being connected in a rotationally fixed manner to the output unit and including at least two rotary percussion surfaces;

a rotary percussion switch-off device for interrupting the transfer of the rotary percussion from the striker to the rotary percussion receiver, at least during a hammer percussion mode of the hand-held power tool device; and a percussion spring configured to accelerate the striker in a direction of the output unit during the hammer percussion mode, wherein, during the rotary percussion mode, the striker delivers, in the direction of the output unit, at least one rotary percussion pulse from the at least two rotary percussion surfaces to the at least two rotary percussion surfaces of the rotary percussion receiver in a rotary direction of the output unit during the rotary percussion mode, and delivers at least one hammer percussion pulse in an axial direction of the output unit, wherein, during the hammer percussion mode, the striker delivers at least one rotary percussion pulse from the hammer percussion surface to the hammer percussion surface of the output unit in an axial direction of the output unit, wherein the rotary percussion switch-off device supports the rotary percussion receiver in an axially displaceable manner such that during the hammer percussion mode (i) the rotary percussion receiver is arranged in an axial position in which the at least two rotary percussion surfaces of the rotary percussion receiver are situated out of range of the at least two rotary percussion surfaces of the striker, and (ii) the hammer percussion surface of the striker axially impacts the hammer percussion surface of the output unit.

2. The hand-held power tool device as recited in claim 1, further comprising:

a rotary drive shaft for rotationally driving the output unit, at least in a percussion drill mode.

3. The hand-held power tool device as recited in claim 2, further comprising:

a rotary drive coupling for disconnecting the rotary drive shaft and the output unit, at least in a rotary percussion mode.

4. The hand-held power tool device as recited in claim 2, wherein the striker at least largely surrounds the rotary drive shaft on at least one plane.

5. The hand-held power tool device as recited in claim 2, further comprising:

a striker drive shaft that at least largely surrounds the rotary drive shaft on at least one plane.

6. The hand-held power tool device as recited in claim 1, further comprising:

a striker coupling for decoupling the striker, at least in a drill mode.

7. The hand-held power tool device as recited in claim 1, wherein during the hammer percussion operation the rotary percussion switch-off device moves the rotary percussion receiver into a position in which the at least two rotary percussion surfaces of the rotary percussion receiver are situated out of range of the at least two rotary percussion surfaces of the striker.

8. A hand-held power tool device, comprising:

an output unit;

a striker;

a rotary percussion receiver for establishing a transfer of a rotary percussion between the striker and the output unit at least during a rotary percussion operation;

a rotary percussion switch-off device for interrupting the transfer of the rotary percussion from the striker to the rotary percussion receiver, at least during a hammer percussion operation; and a percussion spring configured to accelerate the striker in a direction of the output unit during the hammer percussion operation, wherein the striker delivers, in the direction of the output unit, at least one rotary percussion pulse in a rotary direction of the output unit during the rotary percussion operation, and delivers at least one hammer percussion pulse in an axial direction of the output unit during the hammer percussion operation, a striker catch device that, at least during the hammer percussion operation, secures the striker, at least temporarily, in a rotationally fixed manner.

9. The hand-held power tool device as recited in claim 8, wherein the striker catch device rotatably unblocks the striker in a peripheral direction, at least during the rotary percussion operation.

10. A hand-held power tool device, comprising:

an output unit;

a striker;

a rotary percussion receiver for establishing a transfer of a rotary percussion between the striker and the output unit at least during a rotary percussion operation;

a rotary percussion switch-off device for interrupting the transfer of the rotary percussion from the striker to the rotary percussion receiver, at least during a hammer percussion operation; and a percussion spring configured to accelerate the striker in a direction of the output unit during the hammer percussion operation, wherein the striker delivers, in the direction of the output unit, at least one rotary percussion pulse in a rotary direction of the output unit during the rotary percussion operation, and delivers at least one hammer percussion pulse in an axial direction of the output unit during the hammer percussion operation, a chisel coupling for securing the output unit in a rotationally fixed manner in a chisel mode.

* * * * *